United States Patent [19]

Turtle

[11] Patent Number: 5,265,065
[45] Date of Patent: Nov. 23, 1993

[54] METHOD AND APPARATUS FOR INFORMATION RETRIEVAL FROM A DATABASE BY REPLACING DOMAIN SPECIFIC STEMMED PHASES IN A NATURAL LANGUAGE TO CREATE A SEARCH QUERY

[75] Inventor: Howard R. Turtle, Woodbury, Minn.

[73] Assignee: West Publishing Company, Eagan, Minn.

[21] Appl. No.: 773,101

[22] Filed: Oct. 8, 1991

[51] Int. Cl.⁵ .......................... G06F 15/40; G06F 7/10
[52] U.S. Cl. ............................ 395/600; 364/DIG. 1; 364/252.1; 364/283.3; 364/222.81; 364/225.3; 364/226.4; 364/225.4; 364/226.6; 364/260.4
[58] Field of Search ............... 364/200, 300, 419, 513; 395/600

[56] References Cited

U.S. PATENT DOCUMENTS

| | | | |
|---|---|---|---|
| 4,241,402 | 12/1980 | Mayper, Jr. et al. | 364/200 |
| 4,270,182 | 5/1981 | Asija | 364/900 |
| 4,358,824 | 11/1982 | Glickman et al. | 364/200 |
| 4,384,329 | 5/1983 | Rosenbaum et al. | 364/419 |
| 4,471,459 | 9/1984 | Dickinson et al. | 364/900 |
| 4,499,553 | 2/1985 | Dickinson et al. | 364/900 |
| 4,554,631 | 11/1985 | Reddington | 364/300 |
| 4,580,218 | 4/1986 | Raye | 364/300 |
| 4,650,848 | 6/1987 | Schramm | 364/513 |
| 4,688,195 | 8/1987 | Thompson et al. | 364/300 |
| 4,706,212 | 11/1987 | Toma | 364/900 |
| 4,787,035 | 11/1988 | Bourne | 364/300 |
| 4,823,306 | 4/1989 | Barbic et al. | 364/900 |
| 4,839,853 | 6/1989 | Deerwester et al. | 364/900 |
| 4,862,408 | 8/1989 | Zamora | 364/900 |
| 4,868,750 | 9/1989 | Kucera et al. | 364/419 |
| 4,914,590 | 4/1990 | Loatman et al. | 364/419 |
| 4,918,588 | 4/1990 | Barrett et al. | 364/200 |
| 4,931,935 | 6/1990 | Ohira et al. | 364/419 |
| 4,972,349 | 11/1990 | Kleinberger | 364/900 |
| 4,974,191 | 11/1990 | Amirghodsi et al. | 364/900 |
| 4,991,087 | 2/1991 | Burkowski et al. | 364/900 |
| 5,099,425 | 3/1992 | Kanno: Yuji et al. | 364/419 |
| 5,109,509 | 4/1992 | Katayama et al. | 395/600 |
| 5,117,349 | 5/1992 | Tirfling et al. | 395/600 |
| 5,123,103 | 6/1992 | Ohtaki et al. | 395/600 |

OTHER PUBLICATIONS

Turtle et al., "Evaluation of an Interence Network-Based Retrieval Model", *Transactions on Information Systems*, Association for Computer Machinery, vol. 9, No. 3, pp. 187-223 (Jul. 1991).

Croft et al., "Interactive Retrieval of Complex Documents", *Information Processing and Management*, vol. 26, No. 5, pp. 593-613 (1990).

(List continued on next page.)

*Primary Examiner*—Thomas C. Lee
*Assistant Examiner*—Wayne Amsbury
*Attorney, Agent, or Firm*—Kinney & Lange

[57] ABSTRACT

A computer implemented process for creating a search query for an information retrieval system in which a database is provided containing a plurality of stopwords and phrases. A natural language input query defines the composition of the test of documents to be identified. Each word of the natural language input query is compared to the database in order to remove stopwords from the query. The remaining words of the input query are stemmed to their basic roots, and the sequence of stemmed words in the list is compared to phrases in the database to identify phrases in the search query. The phrases are substituted for the sequence of stemmed words from the list so that the remaining elements, namely the substituted phrases and unsubstituted stemmed words, form the search query. The completed search query elements are query nodes of a query network used to match representation nodes of a document network of an inference network. The database includes as options a topic and key database for finding numerical keys, and a synonym database for finding synonyms, both of which are employed in the query as query nodes.

46 Claims, 8 Drawing Sheets

OTHER PUBLICATIONS

Haynes, "Designing a System for the Specialized User: A Case Study", *Proceedings—1985 National Online Meeting* Learned Information Inc., pp. 205-213, (Apr. 30, 1985).

Croft et al, "A Retrieval Model Incorporating Hypertext Links", *Hypertex '89 Proceedings*, Association for Computer Machinery, pp. 213-224 (Nov. 1989).

Turtle et al, "Inference Networks for Document Retrieval", *Coins* Technical Report 90-07, University of Massachusetts (Mar. 1990).

Turtle et al, "Inference Network for Document Retrieval", *Sigir 90*, Association for Computing Machinery, pp. 1-24 (Sep. 1990).

Turtle, "Inference Network for Document Retrieval", Ph.D. Dissertation, *Coins Technical Report 90-92*, University of Massachusetts (Oct. 1990).

Turtle et al, "Efficient Probabilistic Inference for Text Retrieval", *Riao '91 Conference Proceedings*, Recherche d'Information Assistée par Ordinateur, Universitat Autóma de Barcelona, Spain, pp. 644-661 (Apr. 1991).

Porter, "An Algorithm for Suffix Skipping", *Program*, vol. 14, pp. 130-137 (1980).

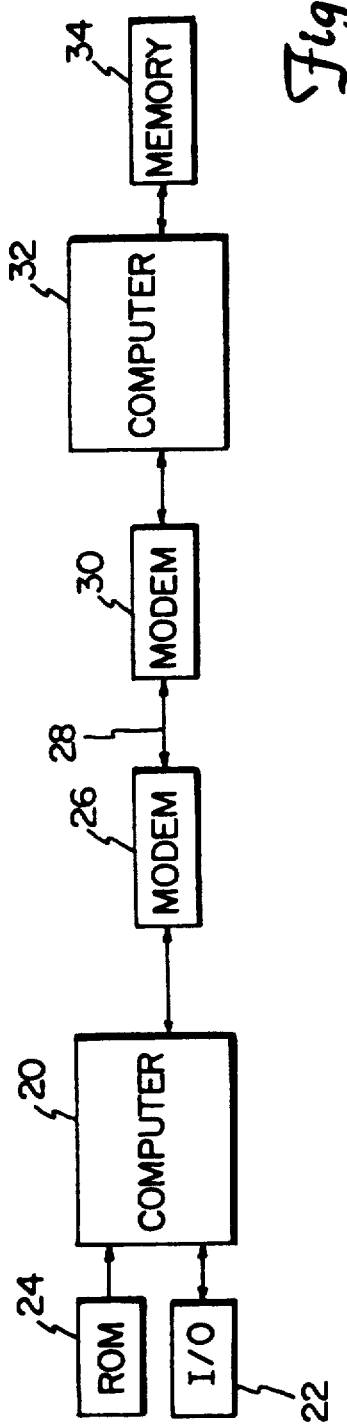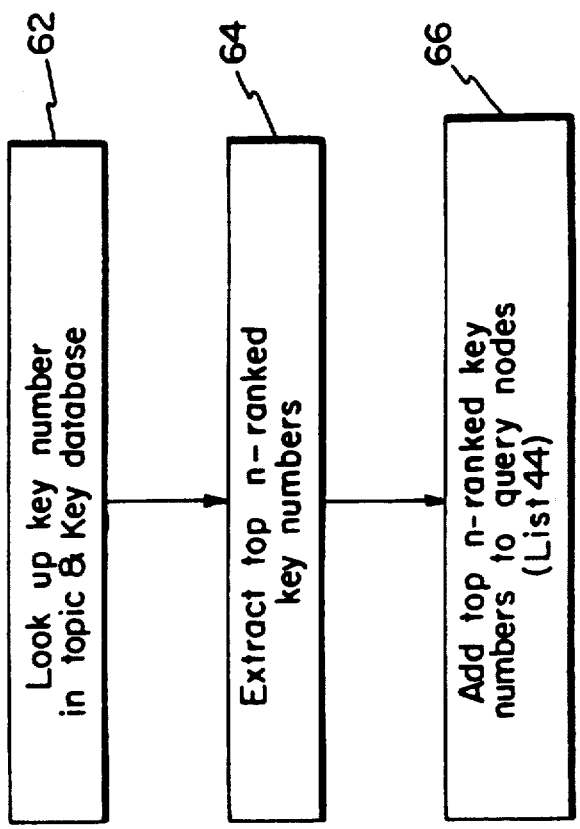

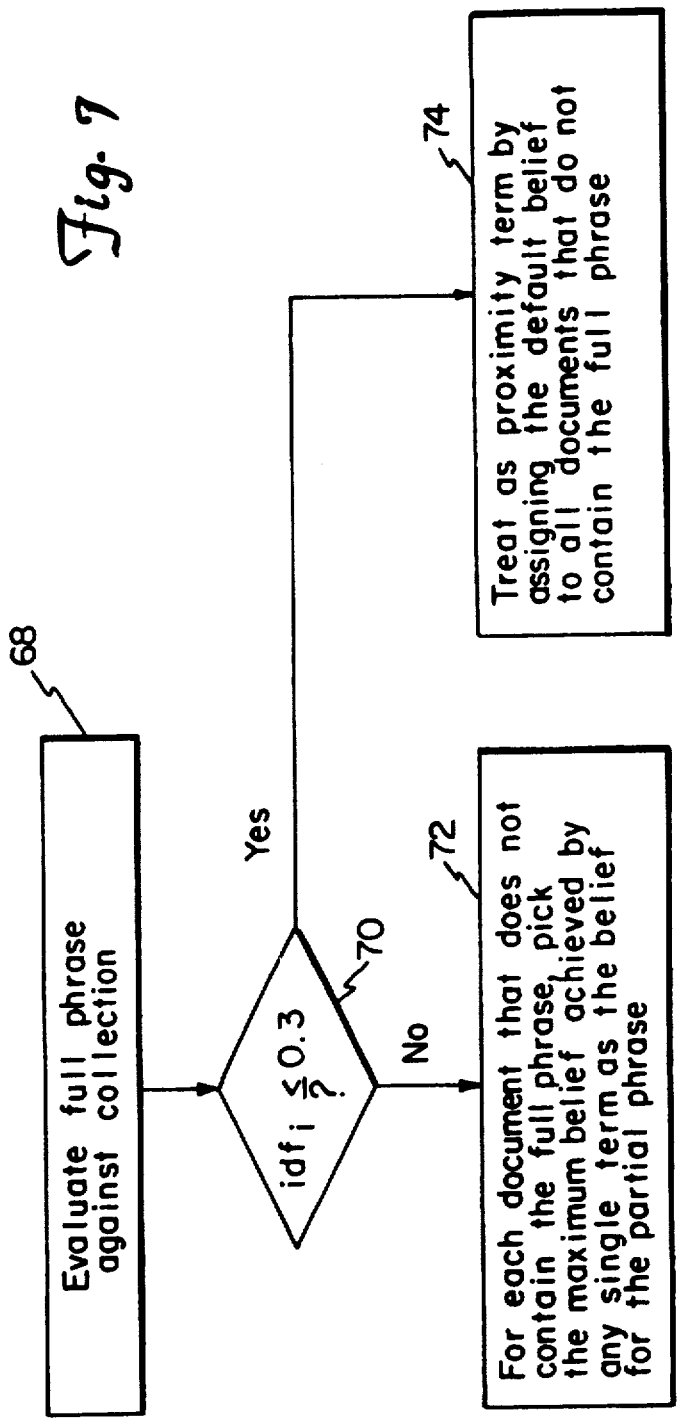

Fig. 9 TOPIC & KEY SUBROUTINE

DOCUMENT NETWORK

METHOD AND APPARATUS FOR INFORMATION RETRIEVAL FROM A DATABASE BY REPLACING DOMAIN SPECIFIC STEMMED PHASES IN A NATURAL LANGUAGE TO CREATE A SEARCH QUERY

BACKGROUND OF THE INVENTION

This invention relates to information retrieval, and particularly to document retrieval from a computer database. More particularly, the invention concerns a method and apparatus for creating a search query in natural language for use in an inference network for document identification and retrieval purposes.

Presently, document retrieval is most commonly performed through use of Boolean search queries to search the texts of documents in the database. These retrieval systems specify strategies for evaluating documents with respect to a given query by logically comparing search queries to document texts. One of the problems associated with text searching is that for a single natural language description of an information need, different Boolean researchers will formulate different Boolean queries to represent that need. Because the queries are different, document ranking will be different for each search, thereby resulting in different documents being retrieved.

More recently, hypertext databases have been developed which emphasize flexible organizations of multimedia "nodes" through connections made with user-specified links and interfaces which facilitate browsing in the network. Early networks employed query-based retrieval strategies to form a ranked list of candidate "starting points" for hypertext browsing. Some systems employed feedback during browsing to modify the initial query and to locate additional starting points. Network structures employing hypertext databases have used automatically and manually generated links between documents and the concepts or terms that are used to represent their content. For example, "document clustering" employs links between documents that are automatically generated by comparing similarities of content. Another technique is "citations" wherein documents are linked by comparing similar citations in them. "Term clustering" and "manually-generated thesauri" provide links between terms, but these have not been altogether suitable for document searching on a reliable basis.

Deductive databases have been developed employing facts about the nodes, and current links between the nodes. A simple query in a deductive database, where N is the only free variable in formula W, is of the form $\{N|W(N)\}$, which is read as "Retrieve all nodes N such that W(N) can be shown to be true in the current database." However, deductive databases have not been successful in information retrieval. Particularly, uncertainty associated with natural language affects the deductive database, including the facts, the rules, and the query. For example, a specific concept may not be an accurate description of a particular node; some rules may be more certain than others; and some parts of a query may be more important than others. For a more complete description of deductive databases, see Croft et al. "A Retrieval Model for Incorporating Hypertext Links", Hypertext '89 Proceedings, pp 213-224, November 1989 (Association for Computing Machinery), incorporated herein by reference.

A Bayesian network is one which employs nodes to represent the document and the query. If a proposition represented by a parent node directly implies the proposition represented by a child node, a implication line is drawn between the two nodes. If-then rules of Bayesian networks are interpreted as conditional probabilities. Thus, a rule A→B is interpreted as a probability $P(B|A)$, and the line connecting A with B is logically labeled with a matrix that specifies $P(B|A)$ for all possible combinations of values of the two nodes. The set of matrices pointing to a node characterizes the dependence relationship between that node and the nodes representing propositions naming it as a consequence. For a given set of prior probabilities for roots of the network, the compiled network is used to compute the probability or degree of belief associated with the remaining nodes.

An inference network is one which is based on a plausible or non-deductive inference. One such network employs a Bayesian network, described by Turtle et al. in "Inference Networks for Document Retrieval", SIGIR 90, pp 1-24 September 1990 (Association for Computing Machinery), incorporated herein by reference. The Bayesian inference network described in the Turtle et al. article comprises a document network and a query network. The document network represents the document collection and employs document nodes, text representation nodes and content representation nodes. A document node corresponds to abstract documents rather than their specific representations, whereas a text representation node corresponds to a specific text representation of the document. A set of content representation nodes corresponds to a single representation technique which has been applied to the documents of the database.

The query network of the Bayesian inference network described in the Turtle et al. article employs an information node identifying the information need, and a plurality of concept nodes corresponding to the concepts that express that information need. A plurality of intermediate query nodes may also be employed where multiple queries are used to express the information requirement.

The Bayesian inference network described in the Turtle et al. article has been quite successful for general purpose databases. However, it has been difficult to formulate the query network to develop nodes which conform to the document network nodes. More particularly, the inference network described in the Turtle et al. article did not use domain-specific knowledge bases to recognize phrases, such as specialized, professional terms, like jargon traditionally associated with specific professions, such as law or medicine.

For a more general discussion concerning inference networks, reference may be made to *Probabilistic Reasoning in Intelligent Systems: Networks of Plausible Inference* by J. Pearl, published by Morgan Kaufmann Publishers, Inc., San Mateo, Calif., 1988, and to *Probabilistic Reasoning in Expert Systems* by R. E. Neapolitan, John Wiley & Sons, New York, N.Y., 1990.

Prior techniques for recognizing phrases in an input query employed syntactic and statistical analysis and manual selection techniques. The present invention employs an automated domain-specific knowledge based system to recognize phrases.

SUMMARY OF THE INVENTION

The present invention provides a computer implemented process performing a search query in which a database is provided containing domain-knowledge specific phrases. A natural language input query is inputted to the computer system, the input query defining the composition of the text of documents sought to be identified. The natural language query is parsed and the stopwords are removed. The remaining words of the input query are stemmed to their basic roots, and the sequence of stemmed words in the list is compared to domain-specific phrases in the database to identify phrases in the search query. The phrases from the database are substituted for the sequence of stemmed words from the list so that the remaining elements, namely, the substituted phrases and unsubstituted stemmed words, form the search query. More particularly, the individual terms of the completed search query form the query nodes of the query network.

An optional and desirable feature of the present invention resides in the provision of a technique for handling citations as a syntactic phrase, the citations being employed for a "weighting" of the statistical probability algorithms of the inference network.

Another optional and desirable feature of the present invention resides in the provision of determining a key number based on a topical database, the key number being added to the search query as a query node and affecting the statistical probability algorithms of the inference network.

BRIEF DESCRIPTION OF THE DRAWINGS

FIG. 3 is a block diagram of a computer system for carrying out the invention.

FIG. 5 is a flowchart and example of the steps for determining a key number for inclusion in the search query described in connection with FIG. 4.

FIG. 7 is a flowchart illustrating the manner by which partial phrases are handled in a document retrieval system.

DETAILED DESCRIPTION OF THE PREFERRED EMBODIMENT

The Inference Network

Inference networks employ a predictive probability scheme in which parent nodes provide support for their children. Thus, the degree to which belief exists in a proposition depends on the degree to which belief exists in the propositions which potentially caused it. This is distinct from a diagnostic probability scheme in which the children provide support for their parents, that is belief in the potential causes of a proposition increases with belief in the proposition. In either case, the propagation of probabilities through the network is done using information passed between adjacent nodes.

Figure 1:
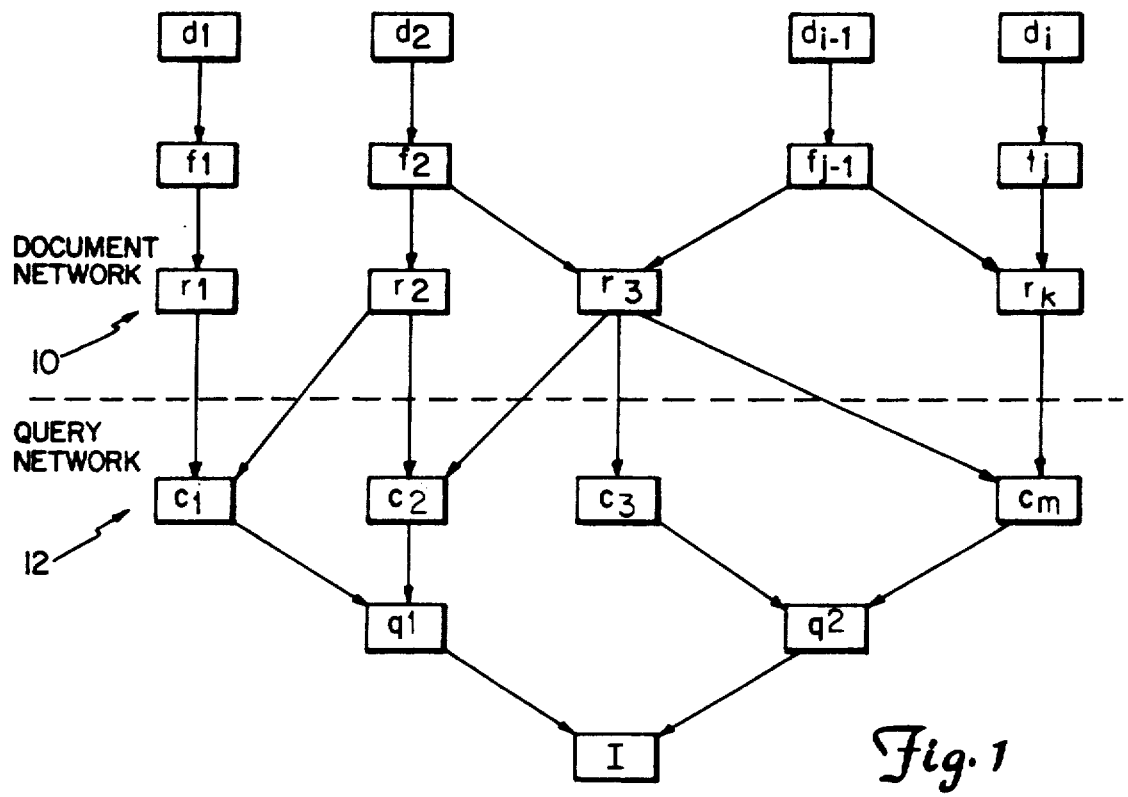
FIG. 1 is a block diagram representation of a Bayesian inference network with which the present invention is used.

FIG. 1 illustrates a Bayesian inference network as described in the aforementioned Turtle et al. article. The Bayesian network shown in FIG. 1 is a directed, acyclic dependency graph in which nodes represent propositional variables or constraints and the arcs represent dependence relations between propositions. An arc between nodes represents that the parent node "causes" or implies the proposition represented by the child node. The child node contains a link matrix or tensor which specifies the probability that the child node is caused by any combination of the parent nodes. Where a node has multiple parents, the link matrix specifies the dependence of that child node on the set of parents and characterizes the dependence relationship between the node and all nodes representing its potential causes. Thus, for all nodes there exists an estimate of the probability that the node takes on a value given any set of values for its parent nodes. If a node has a set of parents $\pi_a = \{p_l, \ldots p_n\}$, the estimated probabilities $P(a|p_l, \ldots p_n)$ are determined.

The inference network is graphically illustrated in FIG. 1 and consists of two component networks: a document network 10 and a query network 12. The document network consists of document nodes $d_1, d_2, \ldots d_{i-1}, d_i$, interior text representation nodes $t_1, t_2, \ldots t_{j-1}, t_j$, and leaf nodes $r_1, r_2, r_3, \ldots r_k$. The document nodes d correspond to abstract documents rather than their physical representations. The interior nodes t are text representation nodes which correspond to specific text representations within a document. The present invention will be described in connection with the text content of documents, but it is understood that the network can support document nodes with multiple children representing additional component types, such as audio, video, etc. Similarly, while a single text may be shared by more than one document, such as journal articles that appear in both serial issue and reprint collections, and parent/divisional patent specifications, the present invention shall be described in connection with a single text for each document. Therefore, for simplicity, the present invention shall assume a one-to-one correspondence between documents and texts.

The leaf nodes r are content representation nodes. There are several subsets of content representation nodes $r_1, r_2, r_3, \ldots r_k$, each corresponding to a single representation technique which has been applied to the document texts. If a document collection has been indexed employing automatic phrase extraction and manually assigned index terms, then the set of representation nodes will consist of distinct subsets or content representation types with disjoint domains. For example, if the phrase "independent contractor" has been extracted and "independent contractor" has been manually assigned as an index term, then two content representation nodes with distinct meanings will be created, one corresponding to the event that "independent contractor" has been automatically extracted from the subset of the collection, and the other corresponding to the event that "independent contractor" has been manually assigned to a subset of the collection. As will become clear hereinafter, some concept representation nodes may be created based on the content of the query network.

Each document node has a prior probability associated with it that describes the probability of observing that document. The document node probability will be equal to 1/(collection size) and will be small for most document collections. Each text node contains a specification of its dependence upon its parent. By assumption, this dependence is complete ($t_i$ is true) when its parent document is observed ($d_i$ is true). Each representation node contains a specification of the conditional probability associated with the node given its set of parent text nodes. The representation node incorporates the effect of any indexing weights (for example, term frequency in each parent text) or term weights (inverse document frequency) associated with the concept.

The query network 12 is an "inverted" directed acyclic graph with a single node I which corresponds to an information need. The root nodes $c_1, c_2, c_3, \ldots c_m$ are the primitive concepts nodes used to express the information requirement. A query concept node, c, contains the specification of the probabilistic dependence of the query concept on its set of parent representation content nodes, r. The query concept nodes $c_1 \ldots c_m$ define the mapping between the concepts used to represent the document collection and the concepts that make up the queries. A single concept node may have more than one parent representation node. For example, concept node $c_2$ may represent the query concept "independent contractor" and have as its parents representation nodes $r_2$ and $r_3$ which correspond to "independent contractor" as a phrase and as a manually assigned term.

Nodes $q_1$, $q_2$ are query nodes representing distinct query representations corresponding to the event that the individual query representation is satisfied. Each query node contains a specification of the query on the query concept it contains. The intermediate query nodes are used in those cases where multiple query representations express the information need I.

Figure 2:
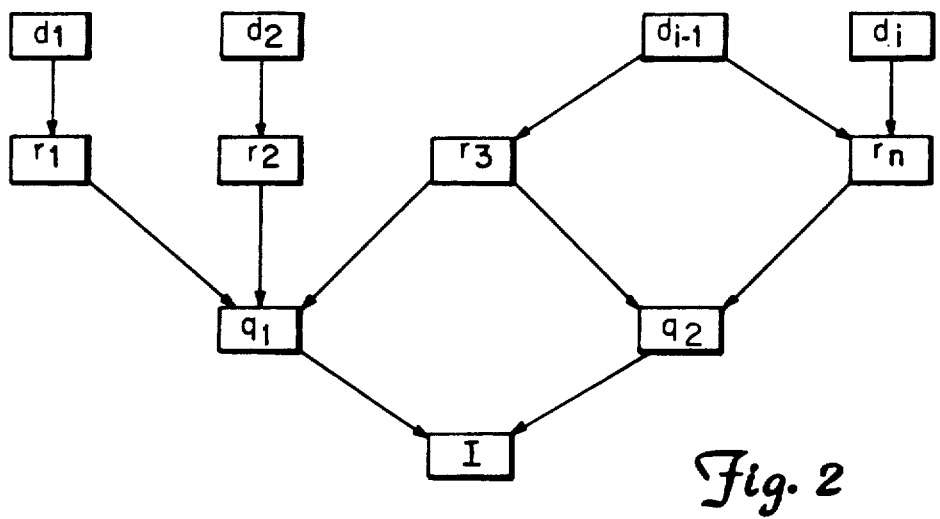
FIG. 2 is a block diagram representation of a simplified Bayesian inference network as in FIG. 1.

As shown in FIG. 1, there is a one-to-one correspondence between document nodes, d, and text nodes, t. Consequently, the network representation of FIG. 1 may be diagrammatically reduced so that the document nodes $d_1, d_2, \ldots d_{i-1}, d_i$ are parents to the representation nodes $r_1, r_2, r_3, \ldots r_k$. In practice, it is possible to further reduce the network of FIG. 1 due to an assumed one-to-one correspondence between the representation nodes $r_1, r_2, r_3, \ldots r_k$, and the concept nodes $c_1, c_2, c_3, \ldots c_m$. The simplified inference network is illustrated in FIG. 2 and is more particularly described in the article by Turtle et al., "Efficient Probabilistic Inference for Text Retrieval," RIAO 91 Conference Proceedings, pp. 644–661, April, 1991 (Recherche d'Informaion Assistée par Ordinateur, Universitat Autònoma de Barcelona, Spain), which article is herein incorporated by reference.

As described above, each child node carries a probability that the child node is caused by the parent node. The estimates of the dependence of a child node Q on its set of parents, $P_1, P_2, \ldots P_n$, are encoded using the following expressions:

$$bel_{or}(Q) = 1 - (1 - p_1) \cdot (1 - p_2) \cdots (1 - p_n) \quad \text{EQ 1}$$
$$bel_{and}(Q) = p_1 p_2 \cdots p_n \quad \text{EQ 2}$$
$$bel_{not}(Q) = 1 - p_1 \quad \text{EQ 3}$$

-continued
$$bel_{wtd-sum}(Q) = \frac{(w_1 p_1 + w_2 p_2 + \ldots + w_n p_n) w_g}{w_1 + w_2 + w_2 + \ldots w_n} \quad \text{EQ 4}$$

where $P(P_1 = \text{true}) = p_1$, $P(P_2 = \text{true}) = p_2$, $P(P_n = \text{true}) = p_n$, $w_1, w_2, \ldots w_n$ are the term weights for each term $P_1, P_2, \ldots P_n$, and $w_g$ is the maximum probability that the child node can achieve, $0 \leq w_g \leq 1$.

As described above, all child nodes carry a probability that the child was caused by the identified parent nodes. Document network 10 is created once and remains constant for each document in the network. The document network structure is not changed, except to add documents to the database. The document nodes d and text nodes t do not change for any given document once the document representation has been entered into document network 10. Most representation nodes are created with the database and are dependant on the document content. Some representation nodes (representing phrases and the like) are created for the particular search being conducted and are dependant of the search query.

Query network 12, on the other hand, changes for each input query defining a document request. Therefore, the concept nodes c of the search network are created with each search query and provide support to the query nodes q and the information need, node I (FIG. 1).

Document searching can be accomplished by a document-based scan or a concept-based scan. A document-based scan is one wherein the text of each document is scanned to determine the likelihood that the document meets the information need, I. More particularly, the representation nodes $r_1, r_2, r_3, \ldots r_k$ of a single document are evaluated with respect to the several query nodes $q_1$, $q_2$ to determine a probability that the document meets the information need. The top n-ranked documents are then selected as potential information need documents. The scan process reaches a point, for example after assigning a probability for more than n documents of a large document collection, that documents can be eliminated from the evaluation process after evaluating subsets of the representation nodes. More particularly, if a given document scores so low of a probability after only evaluating one or two representation nodes, determination can be made that even if the evaluation continued the document still would not score in the top n-ranked documents. Hence, most documents of a large collection are discarded from consideration without having all their representation nodes evaluated.

A concept-based scan is one wherein all documents containing a given representation node are evaluated. As the process continues through several representation nodes, a scorecard is maintained of the probabilities that each document meets the information need, I. More particularly, a single representation node $r_1$ is evaluated for each document in the collection to assign an initial probability that the document meets the concept. The process continues through the several representation nodes with the probabilities being updated with each iteration. The top n-ranked documents are then selected as potential information need documents. If at some point in the process it can be determined that evaluation of additional representation nodes will not alter the ranking of the top n-ranked documents, the scan process can be terminated.

It can be appreciated that the representation nodes $r_1$, $r_2$, $r_3$, ... $r_k$ are nodes dependent on the content of the texts of the documents in the collection. Most representation nodes are created in the document database. Other representation nodes, namely those associated with phrases, synonyms and citations, are not manifest in any static physical embodiment and are created based on each search query. For example, a query manifesting the concept "employee" may be represented by one or more of "actor", "agent", "attendant", "craftsman", "doer", "laborer", "maid", "servant", "smith", "technician" and "worker", to name a few. These various representation nodes are created from the query node at the time of the search, such as through the use of thesauri and other tools to be described. A query node $q_1$, $q_2$, etc. can be manifest in one or more representations.

The Search Query

The present invention concerns development of the concept nodes c for use in the inference network illustrated in FIG. 1. The invention will be described in connection with a specific search query as follows:

"What is the liability of the United States under the Federal Tort Claims Act for injuries sustained by employees of an independent contractor working under contract with an agency of the United States government?"

Thus the present invention will be described in connection with a database for searching legal documents, but it is to be understood the concepts of the invention may be applied to other professional databases, such as medical, theological, financial and other types where specialized vocabularies, citations and digests are employed.

The present invention is carried out through use of a computer system, such as illustrated in FIG. 3 comprising a computer 20 connected to an input/output terminal 22 and a read only memory (ROM) 24. ROM 24 may be any form of read only memory, such as a CD ROM, write protected magnetic disc or tape, or a ROM, PROM or EPROM chip encoded for the purposes described. Computer 20 may be a personal computer (PC) and may be optionally connected through modem 26, telephone communication network 28 and modem 30 to a central computer 32 having a memory 34. In one form of the invention, the document network 10 and the document database containing the texts of documents represented by the document network are contained in the central computer 32 and its associated memory 34. Alternatively, the entire network and database may be resident in the memory of personal computer 20 and ROM 24. In a legal database and document information retrieval network the documents may comprise, for example, decisions and orders of courts and government agencies, rules, statutes and other documents reflecting legal precedent. By maintaining the document database and document network at a central location, legal researchers may input documents into the document database in a uniform manner. Thus, there may be a plurality of computers 20, each having individual ROMs 24 and input/output devices 22, the computers 20 being linked to central computer 32 in a time-sharing mode. The search query is developed by each individual user or researcher by input via the respective input/output terminal 22. For example, input/output terminal 22 may comprise the input keyboard and display unit of PC computer 20 and may include a printer for printing the display and/or document texts.

ROM 24 contains a database containing phrases unique to the specific profession to which the documents being searched are related. In a legal search and retrieval system as described herein, the database on ROM 24 contains stemmed phrases from common legal sources such as Black's or Statsky's Law Dictionary, as well as common names for statutes, regulations and government agencies. ROM 24 may also contain a database of stopwords comprising words of indefinite direction which may be ignored for purposes of developing the concept nodes of the search query. For example, stopwords included in the database on ROM 24 may include prepositions, such as "of", "under", "above", "for", "with", etc., indefinite articles such as "a" and "the", indefinite verbs such as "is", "are", "be", etc. and indefinite adverbs such as "what", "why", "who", etc. The database on ROM 24 may also include a topic and key database such as the numerical keys associated with the well-known West Key Digest system.

Figure 4:
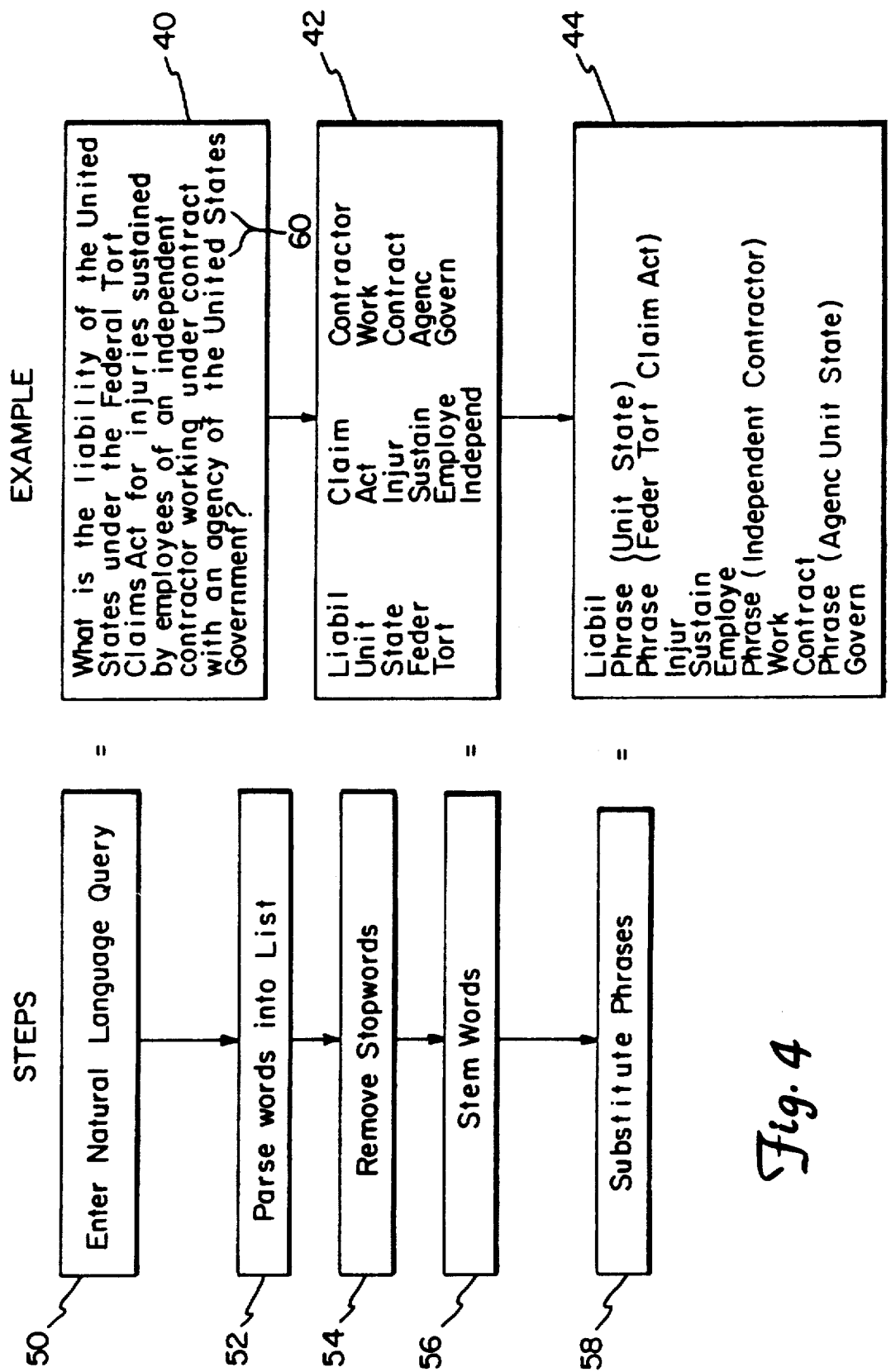
FIG. 4 is a flowchart and example illustrating the steps of creating a search query in accordance with the preferred embodiment of the present invention.

FIG. 4 is a flow diagram illustrating the process steps and the operation on the example given above in the development of the concept nodes c. The natural language query is provided by input through input terminal 22 to computer 20. In the example shown in FIG. 4, the natural language input query is:

"What is the liability of the United States under the Federal Tort Claims Act for injuries sustained by employees of an independent contractor working under contract with an agency of the United States government?"

By way of example, a corresponding WESTLAW Boolean query might be:

"UNITED STATES" U.S. GOVERNMENT (FEDERAL /2 GOVERNMENT) /P TORT /2 CLAIM /P INJUR! /P EMPLOYEE WORKER CREWMAN CREWMEMBER /P INDEPENDENT /2 CONTRACTOR.

As shown in FIG. 4, the natural language query shown in block 40 is inputted at step 50 to computer 20 via input/output terminal 22. The individual words of the natural language query are parsed into a list of words at step 50, and at step 54 each word is compared to the stopwords of the database in ROM 24. The stopwords "what", "is", "the", "of", "under", "for", "by", "an" and "with" are removed from the list. More particularly, the stopwords from the database are loaded into a hash table, and a hash function, h, is determined for each word of the natural language query. If element h of the table is null, the query word is not a stopword and the routine is exited. If the hth element is not a null, it points to a stored stopword. The query term is compared to the stopword, and if a match is determined, the query word is deleted from the query and the routine is exited. If no match is determined, a fixed (prime) value is added to h modulo to the table size and determine again whether the hth element of the table is a null, repeating the process until the query term matches a stopword or a null entry is found.

At step 56, the remaining words are stemmed to reduce each word to its correct morphological root. One suitable software routine for stemming the words is described by Porter "An Algorithm for Suffix Stripping", Program, Vol. 14, pp 130-137 (1980). As a result of step 56 a list of words is developed as shown in block 42, the list comprising the stems of all words in the query, except the stopwords.

Phrases

Previous systems recognized linguistic structure (for example, phrases) by statistical or syntactic techniques. Phrases are recognized using statistical techniques based on the occurrence of phrases in the document collection itself; thus, proximity, co-occurrence, etc. were used. Phrases are recognized using syntactic techniques based on the word/term structure and grammatical rules, rather than statistically. Thus, the phrase "independent contractor" could be recognized statistically by the proximity of the two words and the prior knowledge that the two words often appeared together in documents. The same term could be recognized syntactically by noting the adjective form "independent" and the noun form "contractor" and matching the words using noun phrase grammatical rules. (Manual selection systems have also been used wherein the researcher manually recognizes a phrase during input.)

Previous inference networks employed a two-term logical AND modeled as the product of the beliefs for the individual terms. Beliefs (probabilities) lie in the range between 0 and 1, with 0 representing certainty that the proposition is false and 1 representing certainty that the proposition is true. The belief assigned to a phrase is ordinarily lower than that assigned to either component term. However, experiments reveal that the presence of phrases represents a belief higher than the belief associated with either component term. Consequently, separately identifying phrases as independent representation nodes significantly increases the performance of the information retrieval system. However, single terms of an original query are retained because many of the concepts contained in the original query are not described by phrases. Experimentation has suggested that eliminating single terms significantly degrades retrieval performance even though not all single terms from an original query are required for effective retrieval.

As previously described, the phrase relationships in the search query are recognized by domain-knowledge based techniques (e.g., the phrase database), and by syntactic relationships. The primary reason to solely select syntactical and domain-based phrases for purposes of the query network is to reduce user involvement in identifying phrases for purposes of creating a query.

The present invention employs a domain-knowledge based system wherein the candidate phrases are stored in a database and the individual terms of the query are compared to the database of phrases to locate phrases in the query. An example of a domain-knowledge database is a database containing phrases from a professional dictionary. This type of phrase handling is particularly suitable for professional information retrieval where specialized phrases are often employed.

At step 58 in FIG. 4, computer 20 returns to the database in ROM 24 to determine the presence of phrases within the parsed and stemmed list 42. The phrase database in ROM 24 comprises professional, domain-specific phrases (such as from Black's Law Dictionary) which have had stopwords removed therefrom and which have been stemmed in accordance with the same procedure for stemming the words of a search query. Computer 20 compares the first and second words of list 42 to the database of phrases in ROM 24 to find any phrase having at least those two words as the first words of a phrase. Thus, comparing the first two terms "LIABL" and "UNIT" to the database of phrases (such as Black's Law Dictionary), no match is found. Thus, as shown in block 44, "LIABIL" is retained for the search query. The next two words "UNIT" and "STATE" are compared to the database of phrases and found to correspond to a phrase therein. The next word "FEDER" is then compared to the database to determine if it corresponds to the third word of any phrase commencing with "UNIT STATE". In this case no phrase is found, so both "UNIT" and "STATE" are removed from the list 44 and substituted with a phrase representing the term "UNIT STATE". The terms "FEDER" and "TORT" are compared to the database and found to compare to phrases in the database. The third and fourth words "CLAIM" and "ACT" also compare to at least one phrase commencing with "FED" and "TORT". Consequently, each of the terms "FEDER", "TORT", "CLAIM" and "ACT" are substituted with the phrase "FEDER TORT CLAIM ACT". The process continues to substitute phrases from the database for sequences of stemmed words from the parsed list 42, thereby deriving the list 44.

As shown at reference numeral 60, the original natural language query contained the phrase UNITED STATES after "AGENCY". However, as described below, duplicate words and phrases are eliminated. Consequently, the stem words "UNIT" and "STATE" do not appear after "AGENCY" in the parsed list of stem words shown in block 42. Consequently, the natural language phrase "AGENCY OF THE UNITED STATES" became a phrase in search query 44 comprising the words "AGENC UNIT STATE".

The phrase lookup is accomplished one word at a time. The current word and next word are concatenated and used as a key for the phrase database query. If a record with the key is found, the possible phrases stored under this key are compared to the next word(s) of the query. As each phrase is found, a record of the displacement and length of each found phrase is recorded.

As indicated above, once successive terms have been identified as a phrase, the individual terms do not appear in the completed query shown at block 44 in FIG. 4. In rare cases two phrases might seemingly overlap (i.e., share one or more of the same words). In such a case, the common word is not repeated for each phrase, but instead preference in the overlap is accorded to the longer phrase. For example, if a natural language search query contained "vertical restraints of trade is the dispute", the parsed and stemmed list (with stopwords removed) would appear as: "vertic", "restrain", "trad", "disput". The database would identify two possible phrases: "vertic restrain trad" and "trad disput", with "trad" overlapping in both phrases. With preference accorded to the longest possible phrase, the query nodes would represent (1) "vertic restrain trad" and (2) the single word "disput".

Topic and Key Database

One optional and desirable feature of the present invention resides in the inclusion of a topic and key database, stored in ROM 24 (FIG. 3) to enhance the search query. The topic and key database includes a plurality of topical definitions together with unique key numbers associated therewith. As one example, the topic and key database includes the definitions and key digest numbering system of the well-known West Key Digest System from West Publishing Company of St. Paul, Minn. In the West system, headnotes represent digests of the texts and reasoning of judicial decisions. The headnotes are keyed to a numbering system so that like numbers concern like matters.

In accordance with the present invention, as judicial decisions are entered into the document network, the West key numbers associated with the headnotes are included in the document as identifiers of the contents of the decisions. The key numbers thus become document nodes for information retrieval purposes. As a search query is developed, the user may include the key numbers of the topics to be searched, or the key numbers may be generated from the database in ROM 24 or memory 34 for inclusion in the search query.

FIG. 5 illustrates the process for generating the key numbers for inclusion in the search query. At step 62, the key is located in the topic and key database. More particularly, with reference to FIGS. 1 and 2, the original search query "What is the liability of the United States under the Federal Tort Claims Act for injuries sustained by employees of an independent contractor working under contract with an agency of the United States government?"

is entered into the retrieval system as described in connection with FIG. 4. The words of the query may be parsed, stopwords removed, and the remaining words stemmed, as indicated at steps 52, 54 and 56 in FIG. 4, and the remaining stemmed words in the list of block 42 processed as query nodes q in FIG. 2 to be compared to the texts of the definitions of the topical digests which act as document nodes d. Since the size of the definition portion of the topic and key database is relatively small (compared to the size of the document database), it is preferred that each word of the entire search query (including rooted words) perform the function of query nodes for comparison to the definition texts of the topics. In this preferred manner, the topical database is searched in parallel with the performance of steps 52-56 in FIG. 4. In either case, a probability is determined for each topical definition that the definition matches the search query, and the key numbers associated with those definitions are identified.

At step 64, the key numbers are ranked in accordance with their probabilities, and the top n-ranked key numbers are selected for inclusion in the search query. More particularly, the probabilities are determined in accordance with the relationship expressed in equation 4, with $bel_{wtd\text{-}sum}(Q)$ being the probability that the key number matches the search query. In selecting one or more key numbers for inclusion in the search query, it is preferred that n be no greater than 4. It may be preferable in some cases that the probability, $bel_{wtd\text{-}sum}(Q)$, for the selected key numbers be greater than some threshold value, such as 0.45, thereby assuring that all selected key numbers have a threshold relationship to the query. At step 66, the selected key numbers are added to the search query 44 (FIG. 4) and serve as additional query nodes q.

In carrying out the invention, the example given above generates the following West Key Numbers (the titles to the topics associated with the Key Numbers being set forth for reference:

| | |
|---|---|
| 393K78(9) | United States. Property, Contracts and Liabilities. Torts. Personal Injuries in General. |
| 170AK2515 | Federal Civil Procedure. Tort Cases in General. |
| 393K50 | United States. Government and Officers. Liabilities of Officers or Agents for Negligence or Misconduct. |
| 413K2085 | Workers Compensation. Effect of Act on other Statutory or Common Law Rights of Action and Defense. |

Citations

Case and statute citations are handled syntactically using word-level proximity. More particularly, citations in the original search query 40 (FIG. 4) are identified and removed from the query and encoded into list 44 as single terms or query nodes comprising numeric tokens. For example, the citation 46 U.S.C. 688 may be encoded as 46+2 688, (meaning 46 within two words of 688) and the citation 10 USPQ 2d 1985 may be encoded 10+3 1985. To encompass most citations, particularly of State reporter systems, it is preferred to encode all citations as within five words. Hence, the above two citations will be encoded as 46 +5 688 and 10+5 1985.

Hyphenations

Hyphenated terms in search queries are handled in much the same manner as citations. The hyphen is removed and the component words are searched using an adjacency operation which finds all adjacent occurrences of the component words.

Synonyms

Synonyms are created from a predefined database stored in ROM 24 (FIG. 3). Examples of synonyms include 2d/2nd/second and habeas/habeus. Where a search query includes a word having a synonym, a new representation node r (FIG. 2) is created for each synonym. However, the weight associated with the node is based on the frequency of the entire class of nodes comprising all synonyms, rather than any one term of the class.

Duplicate terms

Where a single word, term or phrase occurs more than once in a query, the word, term or phrase is evaluated only once. After the word, term or phrase has been processed for phrase identification as heretofore described, the duplicate word, term or phrase is simply dropped from the search query, as was the case of the second occurrence of "United States" in the natural language query shown at reference numeral 60 in FIG. 4. As will be explained hereinafter, the component probability score for each document containing a term duplicated in the query is multiplied by the query frequency, and the query normalization factor is increased by that frequency. Thus, the effect is that the duplicated term is evaluated multiple times as dictated by the query, but in a computationally simpler manner.

Thesauri

Thesauri are employed to identify words of similar or related meaning, as opposed to synonyms having identical meaning. In the present invention, the thesauri are used to suggest broader, narrower and related terms to the researcher for inclusion in the search query. The relationships are determined from the phrase database (such as Black's Law Dictionary), from the topic and key database, and from an analysis of the statistical properties of the concept in texts (e.g., terms that frequently co-occur are related).

Document Retrieval

Phrases are not separately permanently identified in the document network. Instead, the representation nodes in the document network are created for the phrase by those concept nodes (FIG. 1) which themselves are a function of the phrase in the query.

Figure 6A:
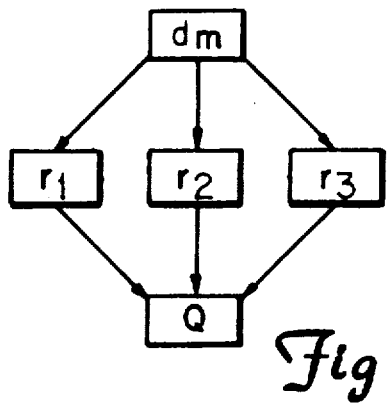
FIGS. 6A-6D are block diagram representations of a simplified Bayesian inference network illustrating different techniques for handling phrases.
Figure 6B:
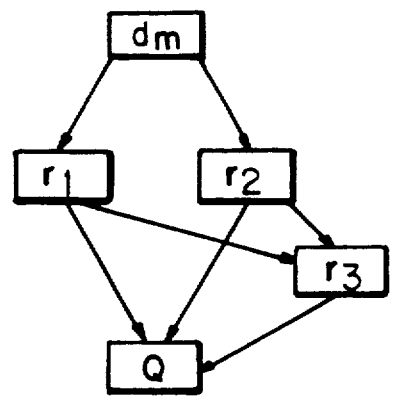
Figure 6C:
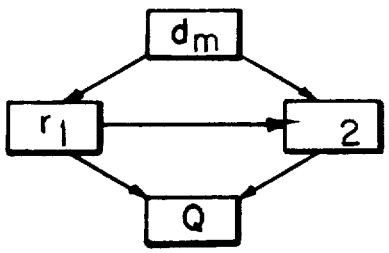
Figure 6D:
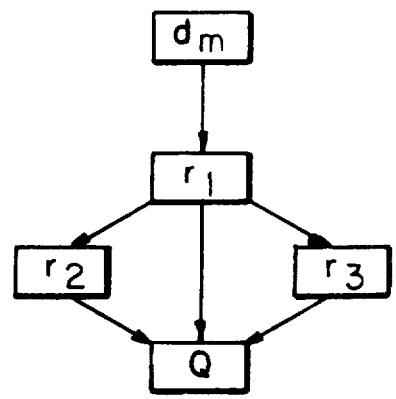

FIGS. 6A-6D illustrate different treatments of phrases in the document network of an inference network. Representation contents $r_1$ and $r_2$ shown in FIGS. 6A-6D correspond to two words in the text of document $d_m$. Representation content $r_3$ corresponds to the phrase in the text consisting of the two words. Q represents the query. For example, $r_1$ and $r_2$ may correspond to the occurrence of the terms "independent" and "contractor", respectively, while $r_3$ corresponds to the occurrence of the phrase "independent contractor". In the model illustrated in FIG. 6A, the phrase is treated as a separate representation content, independent of the contents corresponding to the component words. The belief in the phrase content can be estimated using evidence about component words and the relationship between them, including linguistic relationships. The presence of the query phrase concept in the document increases the probability that the document satisfies the query (or information need). The model of FIG. 6 illustrates the case where the belief in the phrase concept depends on the belief in the concepts corresponding to the two component words. FIG. 6C illustrates a term dependence model where the phrase is not represented as a separate concept, but as a dependence between the concepts corresponding to the component words. A document that contains both words will more likely satisfy the query associated with the phrase due to the increase belief coming from the component words themselves. However, experimentation has revealed that the model of FIG. 6C is less appropriate for phrases and more appropriate for thesauri and synonyms. In FIG. 6D belief in the phrase concept is established from evidence from the document text itself, whereas belief in the concepts representing component words are derived from belief in the phrase itself. The model of FIG. 6D makes explicit the conditional dependence between the component concepts and addresses the practice of some authors that all component words of a phrase might not always be used in the text representation of a document. For the purposes of the present invention it is preferred that document network 10 employ the phrase model of FIG. 6A so that the representation contents for the phrases are independent of the corresponding words. Hence, a match between the concept node of a search query and the content node of a documentation representation is more likely to occur where the search query contains only the phrase, and not the component words. It is understood that the other models (FIGS. 6B-6D) could be employed with varying results.

Thus far, there has been described techniques for obtaining lists containing single words, phrases, proximity terms (hyphenations and citations) and key numbers. These elements represent the basic concept nodes contained in the query. The phrases, hyphenations and citations create representation nodes of the document network. Computer 20 (FIG. 3) forwards the search query to computer 32, which determines the probability that a document containing some subset of these concepts matches the original query. For each single document, the individual concepts represented by each single word, phrase, proximity term, and key number of the query are treated as independent evidence of the probability that the document meets the information need, I. The probability for each concept is determined separately and combined with the other probabilities to form an overall probability estimate.

The probabilities for individual concepts are based on the frequency in which the concept occurs in the document (tf) and the frequency ($f_i$) with which the concept (i) occurs in the entire collection. The collection frequency may also be expressed as an inverse document frequency ($idf_i$). The inference network operates on two basic premises:

A concept that occurs frequently in a document (a large tf) is more likely to be a good descriptor of that document's content, and A concept that occurs infrequently in the collection (a large $idf_i$) is more likely to be a good discriminator than a concept that occurs in many documents.

It can be shown that the probability, $P(c_i|d_j)$ that concept $c_i$ is a "correct" descriptor for document $d_j$ may be represented as $$P(c_i|d_j) = 0.4 + 0.6 \cdot idf_i \cdot tf_{ij} \qquad \text{EQ 5}$$

where $$tf_{ij} = 0.5 + 0.5 \cdot \frac{\log f_{ij}}{\log \max f_j} \qquad \text{EQ 6}$$

and $$idf_i = \frac{\log \frac{d}{f_i}}{\log d} \qquad \text{EQ 7}$$

and where d is the number of documents in the collection, $f_{ij}$ is the frequency of concept i in document j, $f_i$ is the frequency of documents in the collection containing term i (i.e., the number of documents in which term i occurs), and max $f_j$ is the maximum frequency for any term occurring in document j.

As shown by equation 4, the probability is computed for each concept/document pair, and the probabilities are summed. The result is normalized by the number of concepts in the query to determine the overall probability estimate that the document satisfies the information requirement set forth in the query.

Each document which does not contain the concept is assigned a default probability (0.4) which is essentially the probability that the concept accurately describes the content of the document even though its corresponding text does not occur in the document. For documents that do contain the concept, the application of Equations 5-7 is straightforward for single terms. For proximity terms such as citations and hyphenations, the frequency of the satisfaction of the proximity constraints must be determined for the document and the collection as a whole with the new values are used $f_{ij}$ and $f_i$. For example, in the case of a citation (such as 46 U.S.C. 688) the proximity constraint would be "46 + 5 688" as heretofore explained. The frequencies $f_{ij}$ and $f_i$ become the frequencies that the proximity constraint is satisfied (that is, the number of times 46 occurs within five words of "688" for each document and for the number of documents in the collection as a whole).

Phrases are treated in a manner similar to proximity terms, except that a document which does not contain the full phrase receives a partial score for a partial phrase. For example, if a query contains the phrase "FEDERAL TORT CLAIMS ACT" and a document contains the phrase "tort claims" but not "Federal Tort Claims Act", the document will receive a score based on the frequency distribution associated with "TORT CLAIMS". FIG. 7 is a flow diagram illustrating the process of handling partial matches. As shown at step 68, the full phrase is evaluated against the collection as heretofore described. The inverse document frequency ($idf_i$) is determined for the full phrase (step 70), and if $idf_i$ is greater than a predetermined threshold (e.g., 0.3) the maximum belief achieved for any single term is selected as the belief for the partial phrase (step 72). If $idf_i$ is smaller or equal to the threshold value (0.3), the preselected default belief (0.4) is assigned to the documents containing the partial phrase (step 74).

Since the frequency of "TORT CLAIMS" must equal or exceed that of the longer phrase, the probability estimate for the partial phrase would generally be lower than that assigned to documents containing the complete phrase. For phrases which occur extremely often (for example, where $idf_i$ is less than 0.3) it is preferred to dispense with the partial matching strategy, and treat the phrase as a pure proximity term by assigning the default belief (0.4) to all documents containing the partial phrase but not the full phrase (step 74). For phrases which appear less often (where $idf_i$ is greater than 0.3), the maximum belief achieved by any single word of the partial phrase is assigned to the belief for the partial phrase.

As previously explained, duplicate terms are purged from the search query. However, where duplicate terms appear in the search query, the component probability score for each document containing the term is multiplied by the query frequency. For example, if a document contains a term which appears twice in a natural language query receives a component probability of 0.425, the probability score is multiplied by 2 (to 0.850) for that term. When the probabilities are summed and normalized as described above, the normalization factor is increased to reflect the frequency of the duplicated term (increased by 1 in this example). Thus, the duplicated term is treated as if it had been evaluated multiple times as dictated by the query, but in a computationally simpler manner.

As described above, the probability estimates for each document/concept pair are summed and the result is normalized by the number of concepts in the query. For the example given in FIG. 4 the search query shown in block 44 employs eleven concepts, so the total probability for each document will be divided by 11 to determine the overall probability that the given document meets the overall query. For example, assume for a given document that the eleven probabilities are:

| 0.400 | 0.430 | 0.466 |
| 0.543 | 0.436 | 0.433 |
| 0.512 | 0.400 | 0.481 |
| 0.460 | 0.472 |       |

The overall probability is the sum of the individual probabilities (5.033) divided by the number of concepts (11) for a total probability of 0.458. This indicates a probability of 0.458 that the document meets the full query shown in block 40 in FIG. 4. The probability estimate is determined for each document represented in the database, whereupon they are ranked in accordance with the value of the probability estimate to identify the top n documents. The ranking or identification is provided by computer 32 (FIG. 3) to computer 20 for display and/or printout at output terminal 22. Additionally, the document texts may be downloaded from computer 32 to computer 20 for display and/or printout at output terminal 22.

Figure 8:
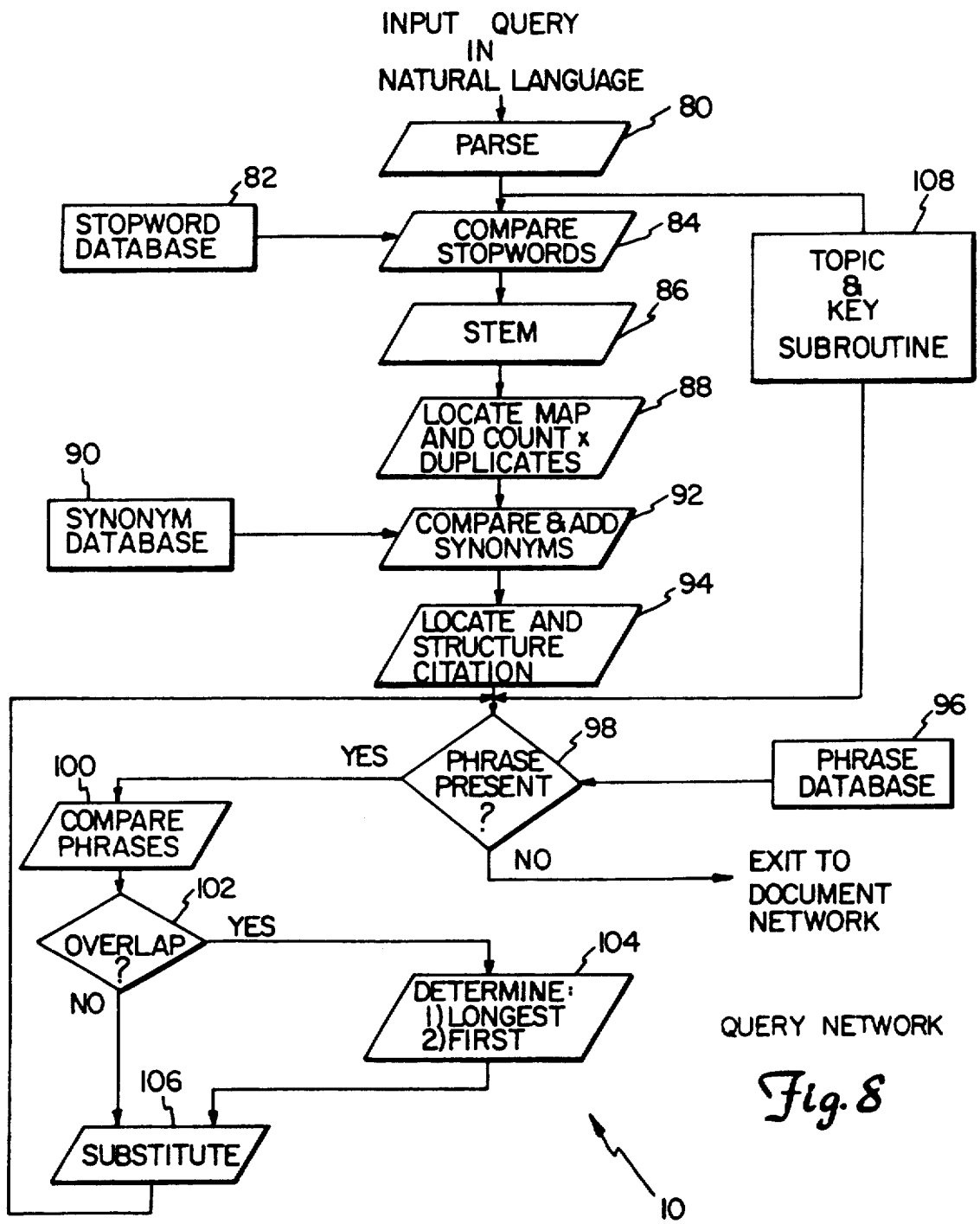
FIG. 8 is a detailed flowchart of the query network in accordance with the presently preferred embodiment of the present invention.
Figure 9:
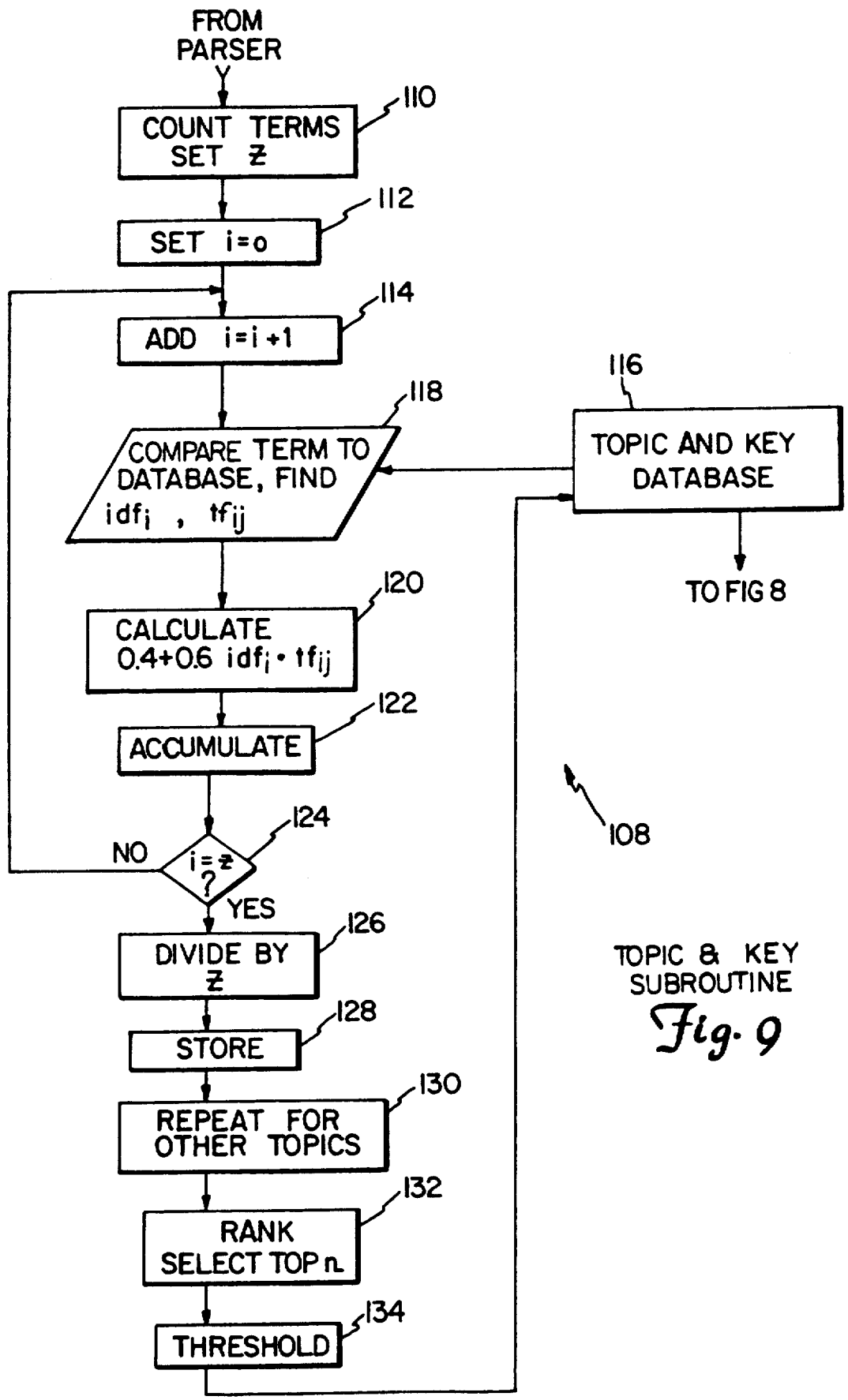
FIG. 9 is a detailed flowchart of a topic and key subroutine used in the query network illustrated in FIG. 8.
Figure 10:
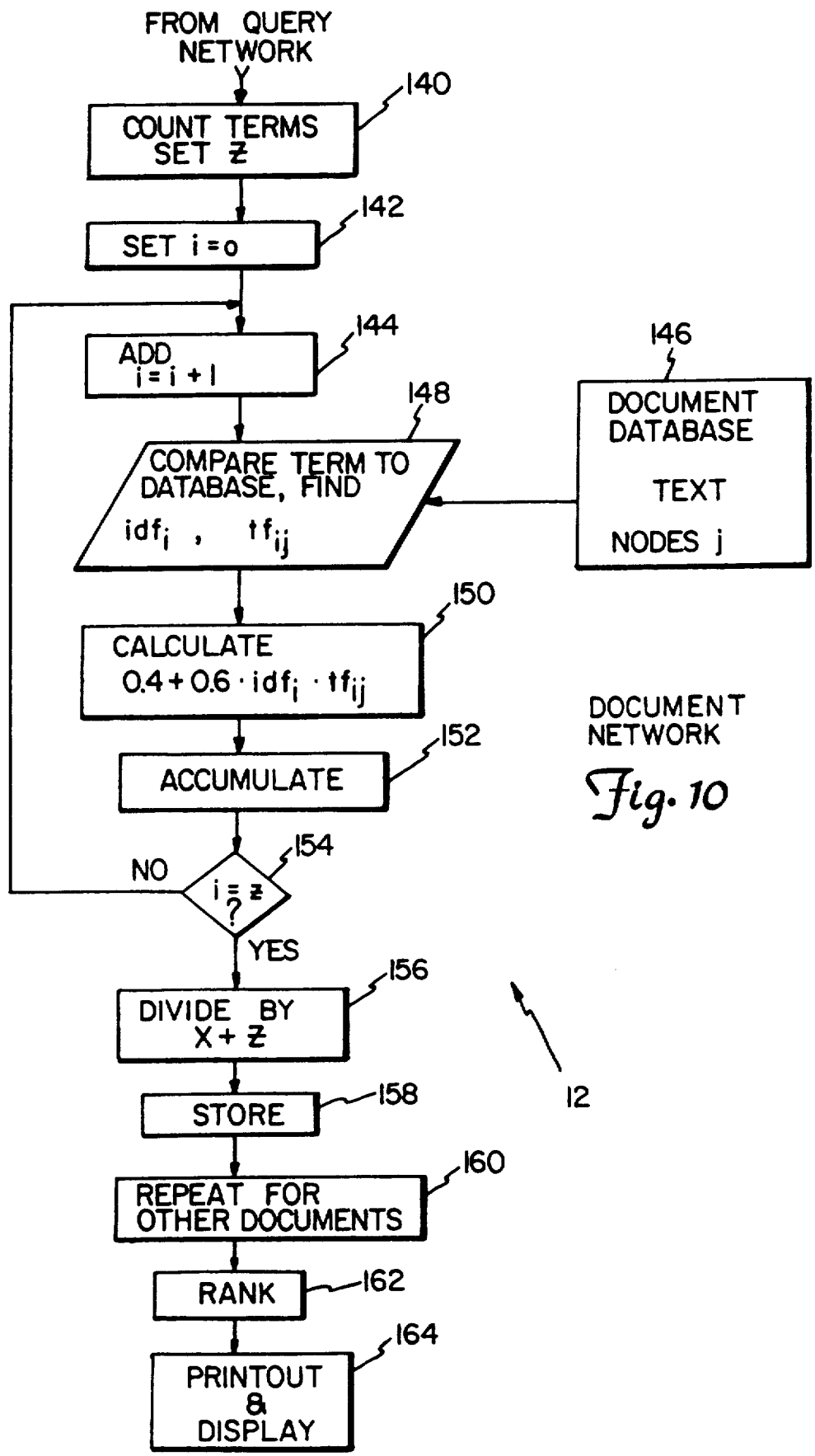
FIG. 10 is a detailed flowchart of a document network used with the query network shown in FIG. 8.

FIGS. 8-10 are detailed flowcharts of the inference network, FIG. 8 being a detailed flowchart of the query network 10, FIG. 9 being a detailed flowchart of the topic and key subroutine, and FIG. 10 being a detailed flowchart of the document network 12. As heretofore described, an input query written in natural language is loaded into the computer, such as into a register therein, and is parsed (step 80) compared to the stopwords in database 82 (step 84) and stemmed at step 86. At step 88, all duplicate terms are located, mapped, counted and removed, with a count x representing the number of duplicate terms removed. The result is the list 42 illustrated in FIG. 4. Using synonym database 90, the list is compared at step 92 to the synonym database and synonyms are added to the list. As will be explained hereinafter, the handling of synonyms may actually occur after handling of the phrases. Citations are located at step 94 and are related by word-level proximity numbers as heretofore described. More particularly, a proximity relationship is established showing the page number within five words of the volume number, without regard to the reporter system employed. The handling of citations, like the handling of synonyms, may be accomplished after phrase resolution, if desired.

Employing phrase database 96, a decision is made step 98 as to whether or not phrases are present in the query. If phrases are present, a comparison is made as step 100 to identify phrases. At step 102 a determination is made as to whether successive phrases share any common term(s) (an overlap condition). More particularly, and as heretofore described, terms which are apparently shared between successive phrases are detected at step 102. At step 104 a determination is made as to which phrase is the longer of the two phrases, and the shared term is included in the longer phrase and excluded from the shorter phrase. As a result of deleting the shared term from the shorter phrase, the resulting shorter phrase may not be a phrase at all, in which case the remaining term(s) are simply handled as stemmed words. On the other hand, if the two phrases are of equal length, then the shared term is accorded to the first phrase and denied to the second phrase.

After overlap conflict is resolved at step 104, the resulting phrase substitution occurs at step 106. The process loops back to step 98 to determine if phrases are still present, and if they are the process repeats until no further phrases are present, and the search query illustrated at block 44 in FIG. 4 is developed.

As heretofore described, the handling of synonyms and citations may occur after resolution of the phrases, rather than before.

Topic and key subroutine 108 receives input from the parsing step 80 and returns key numbers for inclusion in the list 44 illustrated in FIG. 4. The key numbers may be inserted into the search query before or after the handling of phrases, as desired. Topic and key subroutine 108 is illustrated in greater detail in FIG. 9 and includes an input from the parsing step 80 to count the number of terms in the input query and set the number to the number z, at step 110. Step 112, i is set to 0, and at step 114

1 is added to i. Using topic and key database 116 as previously described, the terms of the input query are compared to the terms of the topic and key database to determine the frequency that each term in the input query appears in the database 116 ($idf_i$) and to determine the frequency that the term appears in the respective text of the respective topic ($tf_{ij}$). Thereupon the probability is determined that the topic text meets the individual term of the information need of the input query by determining $0.4 + 0.6\ idf_i.tf_{ij}$. The results for all terms are accumulated at step 122, and at step 124 a determination is made as to whether all of the terms of the input query have been processed. More particularly, a determination is made as to whether i equals z, and if not, the process loops back to step 114 to add 1 to i and continue the process using the next term. When the process has looped through each of the terms of the input query so that i equals z, the amount accumulated at step 120 through the several loops is normalized by dividing by z at step 126 and storing the result at step 128. As a result of the steps through step 126 is to determine the probability that the input query is satisfied by the topical text. The entire process is repeated for the other terms of the input query (step 130), and the topical texts are ranked to determine the top n texts (step 132), it being preferred that n is no greater than 4. If desired, those texts having a probability less than a predetermined threshold may be eliminated at step 134. The result is fed back to ROM 24 containing database 116 to download the key numbers associated with the selected topical texts to list 44 being developed in FIG. 8. It may be possible to eliminate topical texts from the compare process after comparing less than all of the terms in the text to terms in the input query. More particularly, if a text scores so low a probability after comparing a few terms that it becomes evident it cannot score in the top four topics, the text can be discarded from further consideration. Further although the process has been described in connection with a text-based scan system, a concept-based scan system may be employed instead. Thus, the text-based scan and concept-based scan are similar to the document-based scan and concept-based scan described above in connection with the inference network.

As illustrated in FIG. 10, the resulting search query is provided to the document network where, at step 140 the number of terms z is counted, at step 142 i is set to 0 and at step 144 1 is added to i. Using document database 146 which also contains the text of the documents, the frequency that each term appears in database 146 ($idf_i$) is determined and the frequency that the term appears in the respective text ($tf_{ij}$) are determined at step 148. The component probability is determined at step 150 as heretofore described and is accumulated with other component probabilities at step 152. At step 154 a determination is made as to whether or not i equals z (where z is the number of terms in the search query). If all of the terms have not been compared to the database, the process is looped, adding 1 to i and repeated for each term until i equals z at step 154. As heretofore described, when terms having duplicates deleted from the input query are processed at step 148, the probability for such terms is multiplied by the number of duplicates deleted, thereby weighing the probability in accordance with the frequency of the term in the original input query. Consequently, at step 156, it is necessary to divide the accumulated component probability for the document by x+z (where x is the number of duplicate terms deleted from the input query) to thereby normalize the probability. The probability for each document is stored at step 158 and the process repeated at step 160 for the other documents. At step 162 the documents are ranked in accordance with the determined probabilities, and the top ranked documents are printed out or displayed at step 164.

As previously described, the scan technique may be a concept-based scan, rather than the document-based scan described. Further, as previously described, the scan may be aborted after less than complete scan of any given document if the probabilities result in a determination that the document will not reach the cutoff for the n top-ranked documents to be displayed or printed.

While the present invention has been described in connection with a time-shared computer system shown in FIG. 3 wherein search queries are generated by PC computers or dumb terminals for transmission to and time-shared processing by a central computer containing the document network, it may be desirable in some cases to provide the document network (with or without the document text database) to the user for direct use at the PC. In such a case, the document database would be supplied on the same ROM 24 as the databases used with the search query, or on a separately supplied ROM for use with computer 20. For example, in the case of a legal database, updated ROMs containing the document database could be supplied periodically on a subscription basis to the user. In any case, the stopwords, phrases and key numbers would not be changed often, so it would not be necessary to change the ROM containing the databases of stopwords, phrases and key numbers.

Although the present invention has been described with reference to preferred embodiments, workers skilled in the art will recognize that changes may be made in form and detail without departing from the spirit and scope of the invention.

What is claimed is:

1. A computer-implemented process for forming a search query for searching a document database by a computer-implemented search process, the search process identifying documents likely to match the search query by matching individual terms of the search query to individual terms and sequences of terms in the document database, the process for forming the search query comprising:

a) providing a first database containing a plurality of phrases derived from domain specific natural-language phrases, each of said phrases consisting of a plurality of stemmed terms in original order;

b) input to a computer an input query composed in natural language and comprising a plurality of unstemmed terms arranged in a user-selected order;

c) parsing said input query into separate terms;

d) stemming the terms of said input query to form an ordered sequence of stemmed terms, the order of the stemmed terms in the sequence being the same as the order of the unstemmed terms in the input query;

e) selecting groups of stemmed terms, each group consisting of a plurality of successive stemmed terms of the sequence;

f) comparing each group of stemmed terms to each phrase in said first database to identify each group of stemmed terms of the input query that matches a phrase in said first database;

g) for each identified group of stemmed terms, identifying those stemmed terms which are shared by two successive identified groups of stemmed terms, identifying whether the number of stemmed terms in the two successive groups sharing a stemmed term is equal or unequal, assigning the shared stemmed term to only that group of the two successive groups containing the greatest number of stemmed terms if the number of terms is unequal, or assigning the shared stemmed term to only the first group of the two successive groups in the number of terms is equal; and h) replacing each identified group of stemmed terms of the input query by the matching phrase from said first database, the individual terms of the search query comprising each matching phrase substituted for groups of stemmed terms of the input query and each remaining stemmed term of the input query.

2. A computer -implemented process for forming a search query according to claim 1 further including providing a second database containing a plurality of topics each having a descriptive topical text and an associated unique numerical key, each topical text being composed of a plurality of terms, comparing the terms of the input query or the search query to each of the terms of the topical texts in the second database, assigning a statistical weight to each topical text reflecting the probability that the topical text matches the query, ranking the topical texts based on the statistical weight, and inserting into the search query the numerical keys associated with up to n highest ranked topical texts, where n is a predetermined integer.

3. A computer-implemented process for forming a search query according to claim 2 wherein the step of inserting the numerical keys into the search query includes comparing the statistical weights of the topical texts to a predetermined threshold, and inserting the numerical keys into the search query which are associated with topical texts having statistical weights which exceed the predetermined threshold.

4. A computer-implemented process for forming a search query according to claim 2 wherein the statistical weight for each topical text is determined by comparing each term of the query to each term of the topical text, determining the probability that the query term is a correct descriptor of the topical text in accordance with the relationship $$P(c_i|d_j) = 0.4 + 0.6 \cdot idf_i \cdot tf_{ij},$$

where $idf_i$ is based on the frequency of texts in the second database containing the query term and $tf_{ij}$ is based on the frequency with which the query term appears in the respective topical text, and for each topical text adding the probabilities for all terms of the query and normalizing the sum of the probabilities by the number of terms in the query.

5. A computer-implemented process for forming a search query according to claim 1 wherein the input query may include one or more groups of terms forming citations, each citation including numerical terms, said process further includes:

i) identifying each group of terms forming a citation in said input query, and j) replacing each identified group of terms forming a citation by a citation word which comprises the numerical terms of the group of terms forming the citation and a predetermined word-level proximity number.

6. A computer-implemented process for forming a search query according to claim 1 further including before step e, removing stopwords from the input query.

7. A computer system for forming a search query for searching a document database by a computer-implemented search process, the search process identifying documents likely to match the search query by matching individual terms of the search query to individual terms and sequences of terms in the document database, said system comprising:

a) a read only memory containing a first database consisting of a plurality of phrases, each of said phrases derived from domain specific natural-language phrases consisting of a plurality of stemmed terms in original order;

b) register means for storing an input query composed in natural language, the input query comprising a plurality of unstemmed terms arranged in a user-selected order;

c) parsing means responsive to said register means for parsing said input query into separate terms;

d) first processing means for stemming each term in said register means to form an ordered sequence of stemmed terms, the order of the stemmed terms being the same as the order of the unstemmed terms in the input query;

e) selecting means for selecting groups of stemmed terms, each group consisting of a plurality of successive stemmed terms of the sequence;

f) first comparing means for comparing each group of stemmed terms in said register means to each phrase in said first database to identify each group of stemmed terms in the register means which matches a phrase in said first database;

g) second processing means for replacing each identified group of stemmed terms in said register means by the matching phrase in said first database; and h) third processing means for identifying those stemmed terms which are shared by two successive identified groups of stemmed terms, and for identifying whether the number of stemmed terms in the two successive groups sharing a stemmed term is equal or unequal, and fourth processing means for assigning the shared stemmed term to only that group of the two successive groups containing the greatest number of stemmed terms if the number of terms is unequal, or assigning the shared stemmed term to only the first group of the two successive groups in the number of terms is equal.

8. A computer system for forming a search query according to claim 7 wherein said read only memory further contains a second database consisting of a plurality of topics each having a descriptive topical text and an associated unique numerical key, each topical text being composed of a plurality of terms, second comparing means for comparing the terms of the input query or the search query to each of the terms of the topical texts in the second database, fifth processing means for assigning a statistical weight to each topical text reflecting the probability that the topical text matches the query, ranking means for ranking the topical texts based on the statistical weight, said register means being responsive to the ranking means to store the numerical keys associated with up to n highest ranked topical texts, where n is a predetermined integer.

9. A computer system for forming a search query according to claim 8 further including third comparing means for comparing the statistical weight of the topical texts to a predetermined threshold, said register means being responsive to the third comparing means to store numerical keys which are associated with topical texts having statistical weights which exceed the predetermined threshold.

10. A computer system for forming a search query according to claim 8 further including fourth comparing means for comparing each term of the query to each term of the topical text, sixth processing means for determining the probability that the query term is a correct descriptor of the topical text in accordance with the relationship $$P(c_i|d_j) = 0.4 + 0.6 \cdot idf_i \cdot tf_{ij},$$

where $idf_i$ is based on the frequency of texts in the second database containing the query term and $tf_{ij}$ is based on the frequency with which the query term appears in the respective topical text, adding means for adding for each topical text the probabilities for all terms of the query, and normalizing means responsive to the adding means for normalizing the sum of the probabilities by the number of terms in the query.

11. A computer system for forming a search query according to claim 7 wherein said input query may include on or more groups of terms forming citations, each citation having numerical terms said computer system further including:

i) seventh processing means for identifying each group of terms forming a citation in said input query, and j) eighth processing means for replacing each identified group of terms forming a citation by a citation word which comprises the numerical terms of the group of terms forming the citation and a predetermined word-level proximity number.

12. A computer system for forming a search query according to claim 7 wherein the first database further includes a plurality of stopwords, fifth comparing means for comparing each term in said register means to the stopwords in the first database, and deleting means responsive to the fifth comparing means for deleting each term from said register means that matches a stopword.

13. A computer-implemented process for identifying documents of a document database likely to match a search query defining the composition of the text of documents sought to be identified by matching individual terms of the search query to individual terms and sequences of terms in the document database, comprising:

a) providing a first database containing a plurality of phrases, derived from domain specific natural-language phrases each of said phrases consisting of a plurality of stemmed terms in original order, and providing said document database containing representations of the contents of the texts of a plurality of documents to be searched, the text of each document containing a plurality of terms;

b) input to a computer an input query composed in natural language and comprising a plurality of unstemmed terms in a user-selected order;

c) parsing said input query into separate terms;

d) stemming the terms of said input query to form an ordered sequence of stemmed terms for the search query, the order of the stemmed terms being the same as the order of the unstemmed terms in the input query;

e) selecting groups of stemmed terms, each group consisting of a plurality of successive stemmed terms of the sequence;

f) comparing each group of stemmed terms to each phrase in said first database and identifying each group of stemmed terms that matches a phrase in said first database;

g) replacing each identified group of stemmed terms by the matching phrase from said first database, the individual terms of the search query comprising each matching phrase substituted for groups of stemmed terms of the input query and each remaining stemmed term of the input query;

h) after step (g), comparing each term of the search query to the terms in said document database to identify the frequency of occurrences of the stemmed search query terms for individual documents i the document database;

i) assigning a statistical weight to individual documents representing the probability that the document matches the search query based on the number of occurrences of the stemmed search query terms in the representations for each document; and j) ranking the documents based on the statistical weight assigned in step (i).

14. A computer-implemented process for identifying documents according to claim 13 further including, for each identified group of stemmed terms, identifying those stemmed terms which are shared by two successive identified groups of stemmed terms, identifying whether the number of stemmed terms in the two successive groups sharing a stemmed term is equal or unequal, assigning the shared stemmed term to only that group of the two successive groups containing the greatest number of stemmed terms if the number of terms is unequal, or assigning the shared stemmed term to only the first group of the two successive groups if the number of terms is equal.

15. A computer-implemented process for identifying documents according to claim 13 further including providing a second database containing a plurality of topics each having a descriptive topical text and an associated unique numerical key, each topical text being composed of a plurality of terms, comparing the terms of the input query or the search query to each of the terms of the topical texts in the second database, assigning a statistical weight to each topical text reflecting the probability that the topical text matches the query, ranking the topical texts based on the statistical weight, and inserting into the search query the numerical keys associated with up to n highest ranked topical texts, where n is a predetermined integer.

16. A computer-implemented process for identifying documents according to claim 15 wherein the step of inserting the numerical keys into the search query includes comparing the statistical weights of the topical texts to a predetermined threshold, and inserting the numerical keys into the search query which are associated with topical texts having statistical weights which exceed the predetermined threshold.

17. A computer-implemented process for identifying documents according to claim 15 wherein the statistical weight for each topical text is determined by comparing each term of the query to each term of the topical text, determining the probability that the query term is a correct descriptor of the topical text in accordance with the relationship $$P(c_i|d_j) = 0.4 + 0.6 \cdot idf_i \cdot tf_{ij},$$

where $idf_i$ is based on the frequency of texts in the second database containing the query term and $tf_{ij}$ is based on the frequency with which the query term appears in the respective topical text, for each topical text adding the probabilities for all terms of the query and normalizing the sum of the probabilities by the number of terms in the query.

18. Computer-implemented process for identifying documents according to claim 13 wherein the input query may include one or more groups of terms forming citations, each citation including numerical terms, said process further includes:
   k) identifying each group of terms forming a citation in said input query, and
   l) replacing each identified group of terms forming a citation by a citation word which comprises the numerical terms of the group of terms forming the citation and a predetermined word-level proximity number, step (h) includes comparing the identified citation words to terms and sequences of terms in the representations for each document, and step (i) includes assigning a statistical weight to each document concerning the probability that the document matches the search query based on the frequency of occurrences of the identified citation words in the representations for each document.

19. A computer-implemented process for identifying documents according to claim 13 further including displaying the texts of selected ones of said documents.

20. A computer-implemented process for identifying documents according to claim 13 further including before step e, removing stopwords from the input query.

21. A computer system for identifying documents of a document database likely to match a search query defining the composition of the text of documents sought to be identified by matching individual terms of the search query to individual terms and sequences of terms in the document database, the system comprising:
   a) a first read only memory containing a first database containing a plurality of phrases, derived from domain specific natural-language phrases each of said phrases consisting of a plurality of stemmed terms in original order;
   b) a second memory containing the document database containing representations of the contents of the texts of a plurality of documents to be searched, each document text containing a plurality of terms;
   c) register means for storing an input query composed in natural language and comprising a plurality of unstemmed terms arranged in a user-selected order;
   d) parsing means responsive to said register means for parsing said input query into separate terms;
   e) first processing means for stemming each term in said register means to form an ordered sequence of stemmed terms, the order of the stemmed terms being the same as the order of the unstemmed terms in the input query;
   f) selecting means for selecting groups of stemmed terms, each group consisting of a plurality of successive stemmed terms of the sequence;
   g) first comparing means for comparing each group of stemmed terms in said register means to each phrase in said first database to identify each group of stemmed terms that matches a phrase in said first database; and
   h) second processing means for replacing each identified group of stemmed terms in said register means by the matched phrase from said first database, the individual terms of the search query comprising each matching phrase substituted for groups of stemmed terms of the input query and each remaining stemmed term of the input query;
   i) second comparing means for comparing each term of the search query in said register means to the representations for the terms of each document in said second memory to identify the frequency of occurrences of the stemmed query terms for individual document in the second memory;
   j) third processing means responsive to said second comparing means for assigning a statistical weight to the individual document representing the probability that the document matches the search query based on the number of occurrences of the stemmed query terms in the representations for each document; and
   k) fourth processing means responsive to said third processing means for ranking the documents according to statistical weight.

22. A computer system for identifying documents according to claim 21 further including fifth processing means for identifying those stemmed terms which are shared by two successive identified groups of stemmed terms and for identifying whether the number of stemmed terms in the two successive groups sharing a stemmed term is equal or unequal, and sixth processing means for assigning the shared stemmed term to only that group of the two successive groups containing the greatest number of stemmed terms if the number of terms is unequal, or assigning the shared stemmed term to only the first group of the two successive groups if the number of terms is equal.

23. A computer system for identifying documents according to claim 21 wherein said first read only memory further includes second database containing a plurality of topics each having a descriptive text and an associated unique numerical key, each topical text being composed of a plurality of terms, third comparing means for comparing each of the terms of the input query or the search query to each of the terms of the texts of the topics in the second database, seventh processing means for assigning a statistical weight to each topical text reflecting the probability that the topical text matches the query, ranking means for ranking the topical texts based on the statistical weight, said register means being responsive to said ranking means to store the numerical keys associated with up to n highest ranked topical texts, where n is a predetermined integer.

24. A computer system for identifying documents according to claim 23 further including fourth comparing means for comparing the statistical weight of the topical texts to a predetermined threshold, said register means being responsive to the fourth comparing means to store numerical keys which are associated with topical texts having statistical weight which exceed the predetermined threshold.

25. A computer system for identifying documents according to claim 23 further including fifth comparing means for comparing each term of the query to each term of the topical text, eighth processing means for determining the probability that the query term is a correct descriptor of the topical text in accordance with the relationship $$P(d_i|d_j) = 0.4 + 0.6 \cdot idf_i \cdot tf_{ij}.$$

where $idf_i$ is base don the frequency of texts in the second database containing the query term and $tf_{ij}$ is based on the frequency with which the query term appears n the respective topical text, adding means for adding for each topical text the probabilities for all terms of the query, and normalizing means responsive to the adding means for normalizing the sum of the probabilities by the number of terms in the query.

26. A computer system for identifying documents according to claim 21 wherein said input query may include one or more groups of terms forming citations, each citation having numerical terms, said computer system further including ninth processing means for identifying each group of terms forming a citation in said input query, tenth processing means for replacing each identified group of terms forming a citation in said register by a citation word which comprises the numerical terms of the group of terms forming the citation and a predetermined word-level proximity number, sixth comparing means for comparing said citation words in said register means to representations in said second memory to identify the frequency of occurrences of the citation word sin the representations for documents; said third processing means being further responsive to said sixth comparing means for assigning a statistical weights to documents concerning the probability that the document matches the search query.

27. A computer system for identifying document according to claim 21 further including display means for displaying the texts of selected ones of said documents.

28. A computer system for identifying documents according to claim 21 wherein said first read-only memory contains a third database containing a plurality of stopwords, seventh comparing means for comparing each term in said register means to the stopwords in the third database, and deleting means responsive to the seventh comparing means for deleting each term from said register means that matches a stopword.

29. In a computer-implemented process employing an inference network for identifying document sin a first database likely to match a search query defining the composition of the text of documents sought to be identified, said inference network being implemented in computer means forming a query network and a document network, the document network having the a first database containing a plurality of terms representing the texts of a plurality of documents to be searched, each term being represented by a node, the computer means comparing each term, i, or the search query, c, to each of the nodes of each document, j, to determine the probability that the individual term of the search query, $c_i$, is a correct descriptor of the document in accordance with the relationship $$P(c_i|d_j) = 0.4 + 0.6 \cdot idf_i \cdot tf_{ij}.$$

where $idf_i$ is based n the frequency of documents in the entire collection of documents in the first database containing the term i, and $tf_{ij}$ is based on the frequency with which the term, i, appears in the respective document, j, said computer mans adding, for each document in the first database, the probabilities for each term of the search query and normalizing the sum of the probabilities that the terms of the search query are correct descriptors of the document by the number of terms in the search query, said computer means ranking the documents in accordance with the sum of the probabilities for each document, the improvement comprising establishing a query network by:

a) providing a second database containing a plurality of phrases derived from domain specific natural-language phrases each consisting of a plurality of stemmed terms in original order, b) input to the computer means an input query composed in natural language and comprising a plurality of unstemmed words arranged in a user-selected order, c) parsing said input query into separate terms, d) stemming the terms of said input query to form an ordered sequence of stemmed terms for a search query, the order of the stemmed terms being the same as the order of the unstemmed terms in the input query, e) selecting groups of stemmed terms, each group consisting of a plurality of successive stemmed terms of the sequence, f) comparing each group of stemmed terms in said search query to each phrase in said second database and identifying each group of stemmed terms that matches a phrase in said second database, and g) replacing each identified group of stemmed terms by the matching phrase from the second database to form the search query comprising a plurality of individual terms, i, consisting of matched phrases substituted for groups of stemmed terms of the input query and of stemmed terms of the input query not substituted by matched phrases.

30. A computer-implemented process according to claim 29 further including, for each identified group of stemmed terms, identifying those stemmed terms which are shared by two successive identified groups of stemmed terms, identifying whether the number of stemmed terms in the two successive groups sharing a stemmed term is equal or unequal, assigning the shared stemmed term to only that group of the two successive groups containing the greatest number of stemmed terms if the number of terms is unequal, or assigning the shared stemmed term to only the first group of the two successive groups if the number of terms is equal.

31. A computer-implemented process according to claim 29 further including providing a third database containing a plurality of topics each having a descriptive topical text and an associated unique numerical key, each topical text being composed of a plurality of terms, comparing the terms of the input query or the search query to each of the terms of the topical texts in the third database, assigning a statistical weight to each topical text reflecting the probability that the topical text matches the query, ranking the topical texts based on the statistical weight, and inserting into the search query the numerical keys associated with up to n highest ranked topical texts, where n is a predetermined integer.

32. A computer-implemented process according to claim 31 wherein the step of inserting the numerical keys into the search query includes comparing the statistical weights of the topical texts to a predetermined threshold, and inserting the numerical keys into the search query which are associated with topical texts having statistical weights which exceed the predetermined threshold.

33. A computer-implemented process according to claim 31 wherein the statistical weight for each topical text is determined by comparing each term of the query to each term of the topical text, determining the probability that the query term is a correct descriptor of the topical text in accordance with the relationship $$P(c_i|d_j) = 0.4 + 0.6 \cdot idf_i \cdot tf_{ij},$$

where $idf_i$ is based on the frequency of texts in the third database containing the query term and $tf_{ij}$ is based on the frequency with which the query term appears in the respective topical text, for each topical text adding the probabilities for all terms of the query and normalizing the sum of the probabilities that the topical text is a correct descriptor of the query by the number of terms in the query.

34. A computer-implemented process according to claim 29 wherein the input query may include one or more groups of terms forming citations, each citation including numerical terms, said process further includes:
 h) identifying each group of terms forming a citation in said input query, and
 i) replacing each identified group of terms forming a citation by a citation word which comprises the numerical terms of the group of terms forming the citation and a predetermined word-level proximity number so that each citation word becomes a term, i, and the computer means compares the identified citation words to the nodes of each document to determine the probability that the word is the correct descriptor of the document.

35. A computer-implemented process according to claim 29 further including displaying the texts of selected ones of said documents.

36. A computer-implemented process according to claim 29 wherein said second database further includes a plurality of stemmed synonyms of terms, said process including, after step g, comparing the stemmed terms of the input query remaining after substituting matching phrases to the stemmed synonyms in the second database and adding stemmed synonyms of remaining stemmed words to the input query to form the search query c, each individual term i of the search query being a remaining stemmed term or a respective synonym or a matching phrase.

37. A computer-implemented process according to claim 29 further including before step e, removing stop-words from the input query.

38. In a system for identifying documents in a first database likely to match a search query defining the composition of the text of documents sought to be identified, said system including computer means and a read only memory arranged in an inference network forming a query network and a document network, said document network comprising the first database containing a plurality of terms representing the text of each of a plurality of documents, each term being represented by a node, said computer means having first compare means for comparing each term, i, of the search query, c, to each of the nodes of each document, j, in said first database, first processing means for determining the probability that the individual term of the search query, $c_i$, is a correct descriptor of the document, j, in accordance with the following relationship $$P(c_i|d_j) = 0.4 + 0.6 \cdot idf_i \cdot tf_{ij},$$

where $idf_i$ is based on the frequency of documents in the entire collection of documents in the first database containing the term i, and $tf_{ij}$ is based on the frequency with which the term, i, appears in the respective document, j, adding means for adding the probabilities determined by said first processing means for each term of the search query for each document in said first database, normalizing means responsive to said adding means for normalizing the sums of probabilities that the terms of the search query are correct descriptors of the document by the number of terms in the search query, and ranking means responsive to said normalizing means for ranking the documents in said first database in accordance with the values of the normalized sums of probabilities, the improvement of the query network comprising:
 a) a second database recorded on said read only memory, said second database containing a plurality of phrases derived from domain specific natural-language phrases each consisting of a plurality of stemmed terms in original order,
 b) input means connected to said computer means to input an input query to said computer means, the input query being composed in natural language and comprising a plurality of unstemmed words arranged in a user-selected order,
 c) said computer means including
  i) parse means for parsing said input query into separate terms,
  ii) stem means responsive to said input means for stemming each term of said input query to form an ordered sequence of stemmed terms for a search query, the order of the stemmed terms being the same as the order of the unstemmed terms in the input query,
  iii) selecting means for selecting groups of stemmed terms, each group consisting of a plurality of successive stemmed terms of the sequence,
  iv) second compare means for comparing each group of stemmed terms to each phrase i said second database and for identifying each group of stemmed terms that matches a phrase in said second database, and
  v) substitution means responsive to said second compare means for replacing each identified group of stemmed terms from said sequence by the matched phrase to form a search query, c, comprising a plurality of terms, i, each term i consisting of a phrase substituted for a group of stemmed terms in the input query or of stemmed terms in the input query not substituted by phrases.

39. A computer system for identifying documents according to claim 38 further including second processing means for identifying those stemmed terms which are shared by two successive identified groups of stemmed terms and for identifying whether the number of stemmed terms in the two successive groups is equal or unequal, and third processing means for assigning the shared stemmed term to only that group of the two successive groups of stemmed terms containing the greatest number of stemmed terms if the number of terms is unequal or to only the first group of the two successive groups if the number of stemmed terms is equal.

40. A computer system for identifying documents according to claim 38 wherein said read only memory further includes a third database containing a plurality of topics each having a descriptive text and an associated unique numerical key, each text of the topics being composed of a plurality of terms, third compare means for comparing each of the terms of the input query or the search query to each of the terms of the texts of the topics in the third database, fourth processing means for assigning a statistical weight to each topical text reflecting the probability that the topical text matches the query, second ranking means for ranking the topical texts based on the statistical weight, and fifth processing means responsive to the second ranking means for storing into the register means the numerical keys associated with up to n highest ranked topical texts, where n is a predetermined integer.

41. A computer system for identifying documents according to claim 40 further including fourth compare means for comparing the statistical weight of the topical texts to a predetermined threshold, said register means being responsive to the fourth compare means to store numerical keys which are associated with topical texts having statistical weight which exceed the predetermined threshold.

42. A computer system for identifying documents according to claim 40 further including fifth compare means for comparing each term of the query to each term of the topical text, sixth processing means for determining the probability that the query term is a correct descriptor of the topical text in accordance with the relationship $$P(c_i|d_j) = 0.4 + 0.6 \cdot idf_i \cdot tf_{ij}.$$

where $idf_i$ is based on the frequency of texts in the third database containing the query term and $tf_{ij}$ is based on the frequency with which the query term appears in the respective topical text, second adding means for adding for each topical text the probabilities for all terms of the query and second normalizing means responsive to the second adding means for normalizing the sum of the probabilities that the topical text matches the query by the number of terms in the query.

43. A computer system for identifying documents according to claim 38 wherein said input query may include one or more groups of terms forming citations, each citation having numerical terms, and said computer means of said query network further includes:
vi) seventh processing means for identifying each group of terms forming a citation in said input query, and
vii) second substitution means for replacing each identified group of terms by a citation word which comprises the numerical terms of the group of terms forming the citation word and a predetermined word-level proximity number so that each citation word becomes a term, i, of search query, c, and said second compare means being further responsive to said second substitution means for comparing each term, i, of the search query, c, to nodes, j, in said second database.

44. A computer system for identifying documents according to claim 38 further including display means for displaying the texts of selected ones of said documents.

45. A computer system for identifying documents according to claim 38 further wherein said read-only memory contains a fourth database containing a plurality of stemmed synonyms of terms, sixth comparing means for comparing to the stemmed synonyms those stemmed terms of the input query that remain after identified groups of stemmed terms have been substituted by the matching phrases, and eighth processing means for adding stemmed synonyms of remaining stemmed terms to the input query to form the search query c, each individual term i of the search query being a remaining stemmed term or a respective synonym or a matching phrase.

46. A computer system for identifying documents according to claim 38 wherein said read-only memory contains a fifth database containing a plurality of stopwords, seventh comparing means for comparing each term in said register means to the stopwords in the fifth database, and deleting means responsive to the seventh comparing means for deleting each terms from said register means that matches a stopword.

* * * * *

UNITED STATES PATENT AND TRADEMARK OFFICE
CERTIFICATE OF CORRECTION

PATENT NO. : 5,265,065
DATED : November 23, 1993
INVENTOR(S) : Howard R. Turtle

It is certified that error appears in the above-indentified patent and that said Letters Patent is hereby corrected as shown below:

```
On the Title Page, Item [57], line 5, delete "test" and insert --text--.
Column 2, line 22, delete "pp1-24", insert --pp. 1-24--.
Column 13, line 26, delete "FIG. 6", insert --FIG. 6b--.
Column 20, line 15, after "plurality of phrases", insert --derived from
domain specific natural-language phrases--.
Column 20, line 15-16, after "said phrases", delete "derived from
domain specific natural-language phrases--.
Column 21, line 29, delete "on or more", insert --one or more--.
Column 22, line 20, delete "i the", insert --in the--.
Column 23, line 47, after "phrases", deleye ",".
Column 23, line 48, after "phrases", insert --,--.
Column 25, line 8, delete "base don", insert --based on--.
Column 25, line 10, delete "appears n", insert --appears in--.
Column 25, line 30, delete " word sin", insert --words in--.
Column 25, line 35, delete "document", insert --documents--.
Column 25, line 47, delete "document sin", insert --documents in--.
Column 25, line 64, "n" should read --on--.
Column 25, line 68, delete "mans", insert --means--.
Column 28, line 45, delete "i said", insert --in said--.
```

Signed and Sealed this

Twenty-first Day of June, 1994

BRUCE LEHMAN

Attest:

Attesting Officer

Commissioner of Patents and Trademarks